(No Model.) 2 Sheets—Sheet 1.

W. E. SCHNEIDER.
SHUTTER FOR PHOTOGRAPHIC CAMERAS.

No. 363,547. Patented May 24, 1887.

Witnesses
Howard J. Schneider
Edw. H. Eaker

Inventor
William E. Schneider
Attorney
Wm. H. Finckel

N. PETERS, Photo-Lithographer, Washington, D. C.

(No Model.) 2 Sheets—Sheet 2.

W. E. SCHNEIDER.
SHUTTER FOR PHOTOGRAPHIC CAMERAS.

No. 363,547. Patented May 24, 1887.

Witnesses
Harry Y. Davis.
Chas. H. Baker.

Inventor
William E. Schneider
By his Attorney
Wm. N. Finckel.

N. PETERS, Photo-Lithographer, Washington, D. C.

UNITED STATES PATENT OFFICE.

WILLIAM E. SCHNEIDER, OF WASHINGTON, DISTRICT OF COLUMBIA.

SHUTTER FOR PHOTOGRAPHIC CAMERAS.

SPECIFICATION forming part of Letters Patent No. 363,547, dated May 24, 1887.

Application filed February 10, 1887. Serial No. 227,173. (No model.)

*To all whom it may concern:*

Be it known that I, WILLIAM E. SCHNEIDER, a citizen of the United States, residing at Washington, in the District of Columbia, have invented certain new and useful Improvements in Shutters for Photographic Cameras, of which the following is a full, clear, and exact description.

The primary object of this invention is to provide a stereoscopic camera with a quick-acting shutter which may be used in instantaneous or time photography; but the invention is also applicable to ordinary single-lens photographic cameras in either kind of photography.

The invention consists, broadly stated, in a two-leaf shutter combined with operating mechanism of peculiar construction, whereby the shutter may be held open for any desired length of exposure and at any time instantaneously closed automatically, or which may be so arranged as to open and close the shutter for an instantaneous exposure, as I will now proceed to more particularly set forth and claim.

Figure 1:
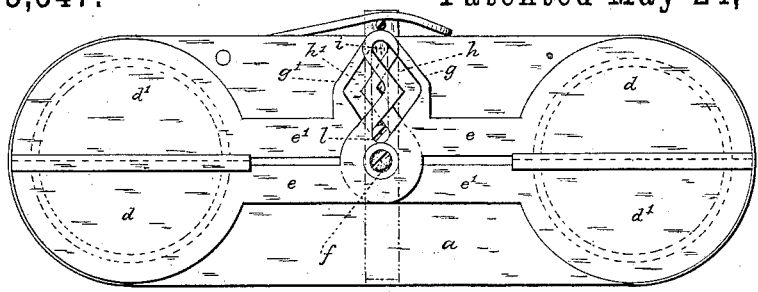
Figure 2:
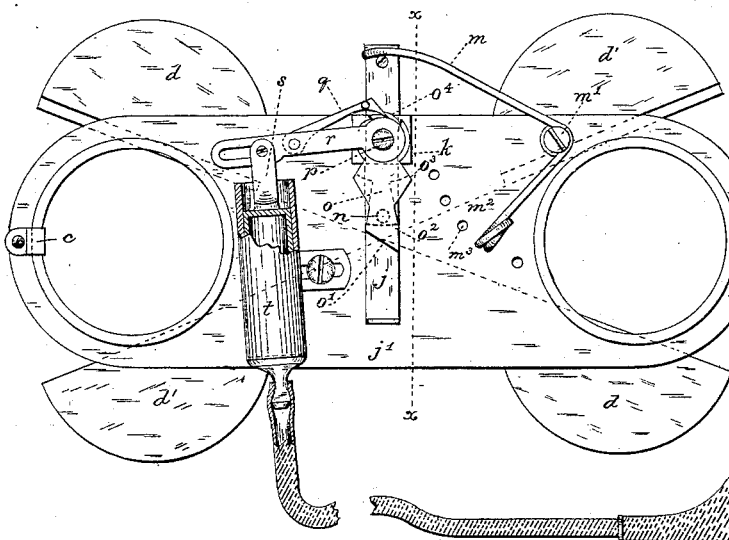
Figure 4:
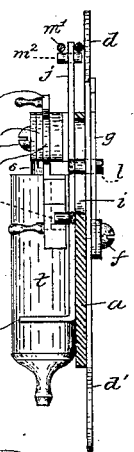
Figure 3:
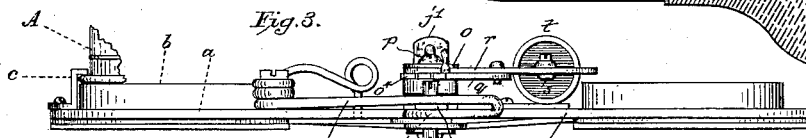
Figure 6:
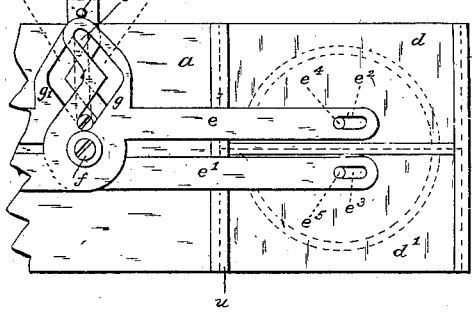
Figure 5:
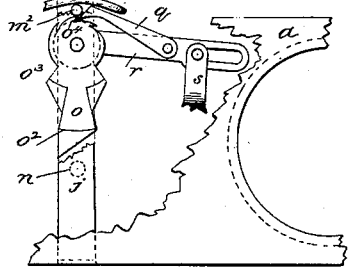
Figure 7:
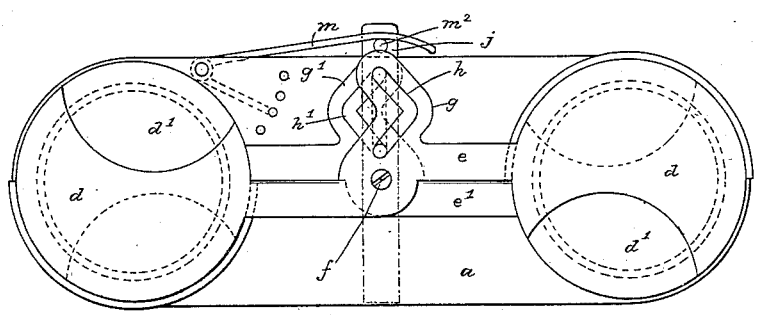
Figure 8:
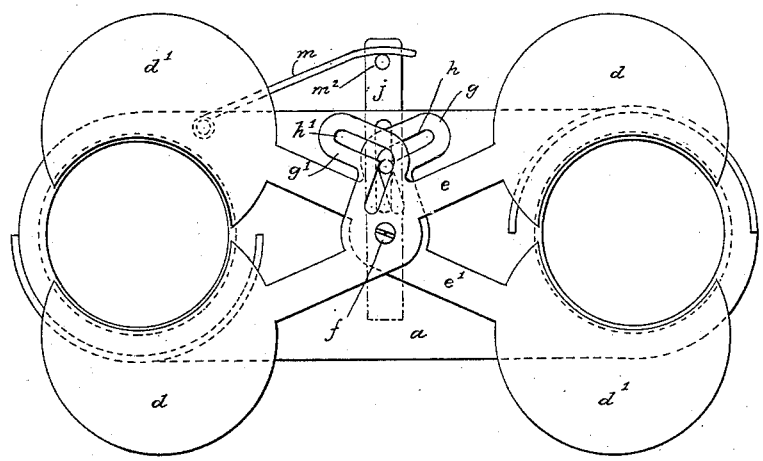

In the accompanying drawings, in the several figures of which like parts are similarly designated, Figure 1 is a front elevation with the shutter closed; Fig. 2, a rear elevation with the shutter open; Fig. 3, a top view; Fig. 4, a vertical section taken in the plane of line $x$ $x$, Fig. 2, the parts being in the same position as in the last-named figure. Fig. 5 is a front elevation of part of the operating mechanism with the face-plate broken away. Fig. 6 is a front elevation of a modification. Fig. 7 is a front elevation of a modification with the shutters closed, and Fig. 8 is a similar view of the same modification with the shutters open.

The face-plate $a$ is provided with the rims $b$, surrounding the openings, and on this face-plate may be provided right-angle turn-buttons or catches $c$, to engage the flanges upon the lens-tubes of the camera, as indicated at A, Fig. 3, to connect the mechanism to the said camera.

I may here remark that my device may be manufactured as a separate article to be applied as an attachment to cameras, or it may be made as an integral part of the camera. In the first case the turn-buttons or catches $c$ will be found an efficient medium for effecting the connection of the attachment to the camera, although I do not limit my invention to such attaching device.

The shutters for a stereoscopic camera consist of the plates $d$ $d'$, having connecting-arms $e$ $e'$, crossing after the manner of shears, and secured to the face-plate by a suitable pivot, $f$—such as a screw—which pivot is common to both. From the upper edge of these arms $e$ $e'$ project plates $g$ $g'$, which are provided with obtuse-angle slots $h$ $h'$, which slots cross one another. In the face-plate $a$ a vertical cross-slot, $i$, is made in alignment with the constantly-intersecting portions of these slots $h$ $h'$ of the shutter-arms. A slide, $j$, is arranged in guides $k$ on the back of the face-plate in vertical alignment with slot $i$, and said slide is provided with a pin, $l$, at right angles thereto, and projecting through slot $i$ and into the slots $h$ $h'$ of the arms of the shutters, so that when the slide $j$ is moved vertically its pin $l$, acting within the slots $h$ $h'$ of the arms of the shutters, will open and shut said shutters. Movement of the slide $j$ in an upward vertical direction until its pin reaches the intersection of the two lines of obtuse-angle slots will open the shutters, and a further vertical movement in the same direction will close the shutters. Upon a downward movement of the thus-elevated slot, when the pin $l$ reaches the intersection of the lines of the slots $h$ and $h'$, the shutters will be opened, and upon a further downward movement the shutters will be again closed. It will therefore be seen that if the slide can be retained at an elevation where its pin $l$ will coincide with the intersection of the two lines of the obtuse-angle slots, the shutters can be held open for any length of time; and so, also, it will be seen that if the said slide can be retained at an elevation where its pin will be at the upper ends of said slots $h$ and $h'$, and then suddenly released and allowed to descend, it will instantly open and shut the shutters for instantaneous photography. The means shown for effecting these two operations may be substantially as follows: The slide $j$ is provided with a spring, $m$, which normally tends to keep said slide at its lowest position and the shutters closed. This spring may be of wire or any other material and secured to the face-plate $a$ by a screw, $m'$, or other device, and may be provided with an arm, $m^2$, adjustable in the series of holes $m^3$ on the face-plate to give more or less tension, and hence force, to said spring. On its rear face the slide $j$ is provided with a pin, $n$, projecting rearwardly, and this pin engages portions of a detent, $o$, pivoted at $p$ to the face-plate. This detent has its lower end, $o'$, beveled, so that when such lower end is struck by the pin $n$ in the ascent of the slide $j$ said detent will be moved laterally out of the path of said pin. This detent is provided with a shoulder, $o^2$, which, when engaged by the pin $n$, will hold open the shutters, as indicated in Figs. 2 and 4; and this engagement of the pin $n$ and shoulder $o^2$ occurs when the slide $j$ has been elevated sufficiently to bring its pin $l$ to the intersection of the lines of slots $h\,h'$. A second shoulder, $o^3$, is provided upon the detent, which will be engaged by the pin $n$ when the slide has been elevated to its highest point, and such arrangement of the parts will be made when instantaneous photography is being practiced. The head of the detent $o$ is provided with notches $o^4$, which are engaged by a pawl or dog, $q$, pivoted to a lever, $r$, which lever has its fulcrum on a pin, $p$, and this lever $r$ is connected by a slip-joint with the piston-rod $s$ of the pneumatic engine $t$, although I may employ an electrical device or any other actuating mechanism for operating the lever $r$. Supposing the parts to be in the position indicated in Fig. 2, if the pneumatic engine be operated so as to elevate the free end of the lever $r$, then the dog $q$ will effect such a rotation or lateral movement of the detent $o$ as to free its shoulder $o^2$ from the pin $n$, and then the spring $m$, acting upon slide $j$, will cause said slide to descend and shut the shutters. If the slide be so elevated that the pin $n$ engages the shoulder $o^3$, then when the engine is operated so as to disengage the detent and slide-pin the descent of the slide will open and then shut the shutters.

The pneumatic engine shown consists of a cylinder with a piston, the air-pressure being supplied by a compressible bulb connected with the cylinder by a flexible tube in any ordinary way and of any ordinary construction.

The invention is obviously applicable to a camera having only one lens.

Instead of having the shutters operate upon a pivot, I may arrange them to slide vertically in fixed guides $u$ on the face-plate, and with such construction the obtuse-angled slots $h\,h'$ will be arranged upon arms $e\,e'$, the free ends of which are provided with slots $e^2\,e^3$, which engage pins $e^4\,e^5$ on the said vertically-moving shutters.

The spring $m$ may be connected with slide $j$ in any suitable manner; but as herein shown its end $m'$ is made as a long loop, which embraces the slide at its upper end and bears against a cross-pin, $m^2$, in said slide.

The slide $j$ may have a thumb-piece, $j'$, projecting therefrom at the lower end at right angles thereto for raising the same.

The meeting edges of the shutters are constructed with suitably-shaped overlapping portions $d^2\,d^3$, to exclude the light when in conjunction and admit it when separating by gradually exposing the tubes from the center. The most economical mode of effecting this operation is to construct the shutters themselves with curvilinear adjacent edges of substantially the same diameter as that of the lens-tubes. (See Figs. 7 and 8.)

It will be understood that in order to insure close fitting of the shutters over the lens tube or tubes any suitable packing may be interposed between the shutters and the tubes, such as felt, velvet, metal, or other material.

What I claim is—

1. A face-plate for photographic cameras, combined with a two-leaf shutter having slotted crossed arms, an operating-slide connected with said slotted arms, a detent for holding said slide, and means, substantially as described, for operating the detent and through it the slide to shut the shutters or to open and shut the shutters, substantially as set forth.

2. Shutters for a stereoscopic camera, consisting of leaves provided with crossed arms having substantially obtuse-angle slots crossing each other, combined with a slide having a pin engaging such slots, a detent for retaining said pin in any given position, and a tripping device for said detent, substantially as set forth.

3. Shutters $d$ and $d'$, movable toward and from each other to close and open the lens-tube of a camera, and arms $e\,e'$, provided with cross-slotted portions, combined with a face-plate having a vertical slot in alignment with the intersecting portions of said first-named slots, a slide having a pin passing into all of said slots, and also provided with a pin on its opposite face, a pivoted detent having shoulders to engage said last-named pin, a dog engaging said detent, a lever carrying said dog, and a lever-operating device—such as a pneumatic engine—for actuating the dog to disconnect the detent from the slide, substantially as described.

4. A two-leaf shutter in which the leaves are movable toward and from each other to shut and open the lens-tube, provided with a slide and crossed arms pivotally actuated, a supporting-plate provided with a slot, a slide provided with a pin engaging all of said slots, and a spring co-operating with said slide, a detent for said slide, and means, substantially as described, for operating said detent, substantially as set forth.

5. A face-plate for a stereoscopic camera, shutters $d\,d'$, connected to said face-plate by crossed arms, slotted projections on said crossed arms, a slide connected with said slotted arms and spring-pressed, and a detent and means for operating it, substantially as described.

6. The swinging detent provided with a beveled end, combined with the shutters, crossed arms, and slide, substantially as described.

7. A detent provided with shoulders $o^2$ and $o^3$, combined with a slide having a pin to cooperate with said shoulders, a spring bearing down upon said slide, means, substantially as described, for disengaging the detent from the slide, and shutters connected with said slide, substantially as described.

8. A two-leaf shutter and guides in which the leaves have a vertical movement across the lens-tube to open and close the same, combined with pivoted crossed arms having slotted projections $g\ g'$, and a spring-pressed slide, combined and arranged to operate substantially as described.

9. Plates $d$ and $d'$, having overlapping edges to cover and uncover the lens, centrally-crossed arms $e\ e'$ therefor, provided with slotted projections $g\ g'$, and an operating-slide, substantially as described.

In testimony whereof I have hereunto set my hand this 10th day of February, A. D. 1887.

W. E. SCHNEIDER.

Witnesses:
WM. H. FINCKEL,
EDWIN A. FINCKEL.

It is hereby certified that in Letters Patent No. 363,547, granted May 24, 1887, upon the application of William E. Schneider, of Washington, District of Columbia, for an improvement in "Shutters for Photographic Cameras," errors appear in the printed specification requiring the following corrections, viz: On page 3, in line 15, the comma after the word "lens" and the hyphen between the words "centrally" and "crossed" should be stricken out and a comma should be inserted after the word "centrally;" and that the said Letters Patent should be read with these corrections therein that the same may conform to the record of the case in the Patent Office.

Signed, countersigned, and sealed this 31st day of May, A. D. 1887.

[SEAL.]

D. L. HAWKINS,
*Acting Secretary of the Interior.*

Countersigned:
BENTON J. HALL,
*Commissioner of Patents.*